US008515077B2

(12) United States Patent
DeLuca (10) Patent No.: US 8,515,077 B2
(45) Date of Patent: Aug. 20, 2013

(54) AUTOMATIC APPLICATION MANAGEMENT IN A SHORT-RANGE WIRELESS SYSTEM

(75) Inventor: Michael Joseph DeLuca, Boca Raton, FL (US)

(73) Assignee: Research In Motion Limited, Waterloo (CA)

( * ) Notice: Subject to any disclaimer, the term of this patent is extended or adjusted under 35 U.S.C. 154(b) by 245 days.

(21) Appl. No.: 12/778,661

(22) Filed: May 12, 2010

(65) Prior Publication Data

US 2011/0280403 A1 Nov. 17, 2011

(51) Int. Cl.
 *H04L 9/08* (2006.01)
(52) U.S. Cl.
 USPC ........... 380/278; 380/270; 380/247; 455/41.2
(58) Field of Classification Search
 USPC .................. 380/278, 247, 270; 455/41.2
 See application file for complete search history.

(56) References Cited

U.S. PATENT DOCUMENTS

| | | | |
|---|---|---|---|
| 6,772,331 | B1 | 8/2004 | Hind |
| 7,024,230 | B2 * | 4/2006 | Curtiss et al. ............. 455/569.1 |
| 7,460,855 | B2 * | 12/2008 | Barkley et al. ................ 455/411 |
| 7,545,941 | B2 * | 6/2009 | Sovio et al. .................. 380/270 |
| 2002/0184331 | A1 | 12/2002 | Blight |
| 2003/0158952 | A1 | 8/2003 | Fleming |
| 2004/0009769 | A1 | 1/2004 | Yokoyama |
| 2004/0068567 | A1 * | 4/2004 | Moran et al. .................. 709/227 |
| 2005/0278450 | A1 * | 12/2005 | Pelletier et al. .............. 709/229 |
| 2006/0165060 | A1 * | 7/2006 | Dua .............................. 370/352 |
| 2009/0275346 | A1 * | 11/2009 | Bauman et al. ............ 455/456.2 |
| 2011/0053491 | A1 * | 3/2011 | Bolton et al. ............... 455/3.06 |
| 2011/0221590 | A1 * | 9/2011 | Baker et al. .............. 340/539.12 |

FOREIGN PATENT DOCUMENTS

EP 1321880 6/2003

OTHER PUBLICATIONS

European Search Report application No. 10162794.1. Retrieved on Aug. 24, 2010.

* cited by examiner

*Primary Examiner* — Amare F Tabor
(74) *Attorney, Agent, or Firm* — Novak Druce Connolly Bove + Quigg LLP (57) ABSTRACT

Method, device and computer readable storage medium for managing applications on a wireless device by providing applications on the wireless device. The wireless device is used in a short-range wireless system with an effective range. The wireless device and a client device are brought into proximity and thereby into the effective range of the short-range wireless system. The wireless device and the client device are connected and associated. The application is associated with the client device. The application is then automatically launched on the wireless device.

16 Claims, 8 Drawing Sheets

AUTOMATIC APPLICATION MANAGEMENT IN A SHORT-RANGE WIRELESS SYSTEM

BACKGROUND

The present patent disclosure relates generally to application management, and more specifically, to application management in a short-range wireless system.

Short-range wireless systems provide interconnections between wireless devices, and wireless accessories. Generally, short-range wireless systems use a wireless personal area network (PAN), which uses low-cost, low-power wireless devices that have a typical range of tens of meters.

An example of a wireless PAN technology is Bluetooth™. Bluetooth™ operates in the 2.4 GHz Industrial, Scientific, and Medical (ISM) band and provides a peak air-link speed of one Mbps and a power consumption low enough for use in personal, portable electronics such as a personal digital assistants or mobile phones.

A piconet is a network linking a group of wireless devices that are physically close enough to exchange information using Bluetooth™. Wireless devices joining and leaving the network as they enter and leave the proximity of the remaining wireless devices. Each Bluetooth™ device is capable to find other Bluetooth™ devices as they enter and leave the effective range of the short-range wireless network. The requesting Bluetooth™ device in a client role and the responding Bluetooth™ device in a server role establish a proximity link between the two devices in a process called pairing. Two devices need to be paired once to communicate with each other; the pairing process is typically triggered automatically the first time a devices receives a connection request from a device it is not yet paired with. Once a pairing has been established, it is remembered by the devices, which can then connect to each without user intervention.

Other examples of wireless PAN technology include Infrared Data Association (IrDA), Ultra-Wideband (UWB), Z-Wave and ZigBee.

Today's wireless devices, such a BLACKBERRY, for example, are also multi-function devices which can function, for example, as a portable media player suitable for the consumer's entertainment consumption. Unfortunately, the process for launching the media player on an external device, such as external speakers or a video viewer, is tedious at best when compared to today's TVs and radios, which typically require only one button press for the user to lean back and begin enjoying the media presentation.

Advantageously to TV or radio, portable devices can travel from one entertainment environment to another, such as from an office to a car while providing contiguous entertainment from one space to the other. For example the user could listen to the same play list or internet radio station in both the office and the car using a wireless device such as a BLACKBERRY. Further, when traveling between locations, the application should pause, and resume when paired in the new location, thereby realizing a contiguous entertainment experience not possible with conventional radio or TV Portable devices.

Currently, when two wireless devices or a wireless device and a wireless accessory complete the paring, any application associated with the device or accessory is manually selected and launched by the user. In the example of a portable media player this often requires numerous manual entry events password entry, select application, launch application, choose play list, start playing.

Therefore, there is a need to provide a first wireless device, when paired with a second wireless device and/or a wireless accessory, to automatically launch an application associated with the second wireless device and/or the wireless accessory. There is further a need to provide a wireless device, when the wireless device moves from a first location to a second location, the wireless device automatically launches an application at the second location that was active at the first location.

BRIEF DESCRIPTION OF THE DRAWINGS

These and other features of the patent disclosure will become more apparent from the following description in which reference is made to the appended drawings wherein.

DETAILED DESCRIPTION OF PREFERRED EMBODIMENTS

In accordance with one aspect of the present patent disclosure there is provided a method for managing applications on a wireless device for: providing one or more applications on the wireless device, the wireless device used in a short-range wireless system having an effective range; detecting a presence of a client device in the effective range of the short-range wireless system; associating the wireless device with the client device, selecting an application from the one or more applications for the associated client device; associating the application with the client device; and launching the application on the wireless device.

In accordance with another aspect of the present patent disclosure there is provided a computer readable storage medium storing instructions or statements for use in the execution in a computer of the above method for managing applications on a wireless device.

In accordance with another aspect of the present patent disclosure there is provided a wireless device used in a short-range wireless system, the wireless device comprising: a memory including one or more applications, and an application device association table for associating one or more applications with a plurality of client devices; and a processor for: detecting a presence of a client device in an effective range of the short-range wireless system; associating the wireless device with the client device; selecting an application from the one or more applications for the associated client device; associating the application with the client device; and launching the application.

Preferably, the method further comprises authenticating the wireless device and the client device; and exchanging link keys between the wireless device and the client device.

Preferably, the method further comprises exchanging encryption keys between the wireless device and the client device.

Preferably, the wireless device is a mobile phone.

Preferably, the short-range wireless system uses Infrared Data Association (IrDA), Ultra-Wideband (UWB), Z-Wave or Zig Bee.

Preferably, the method further comprises: disassociating the wireless device and the client device; associating the wireless device with a second client device; associating the selected application with the second client device; and continuing the execution of the application on the wireless device.

Preferably, the method further comprises: receiving data after the disassociating the wireless device and the client device; buffering the data on the wireless device; and continuing the execution of the application on the wireless device using the buffered data.

Preferably, the method further comprises sending data from the wireless device to the client device or from the client device to the wireless device.

Preferably, the short-range wireless system is a Bluetooth™ system.

Preferably, the associating the wireless device with the client device comprises pairing the wireless device with the client device.

Preferably, the authentication uses numeric comparison, out-of-band (OOB), Just Works, or passkey entry protocol.

Preferably, the Bluetooth system forms a wireless personal area network (PAN).

Preferably, the client device is an accessory.

Preferably, the application is an audio only application and the client device is an audio reproduction device.

Preferably, the application is a video application and the client device is a video reproduction device.

Preferably, the application is a data exchange application and the client device is a data exchange device.

Reference will now be made in detail to some specific embodiments of the patent disclosure. Examples of these specific embodiments are illustrated in the accompanying drawings.

Figure 1:
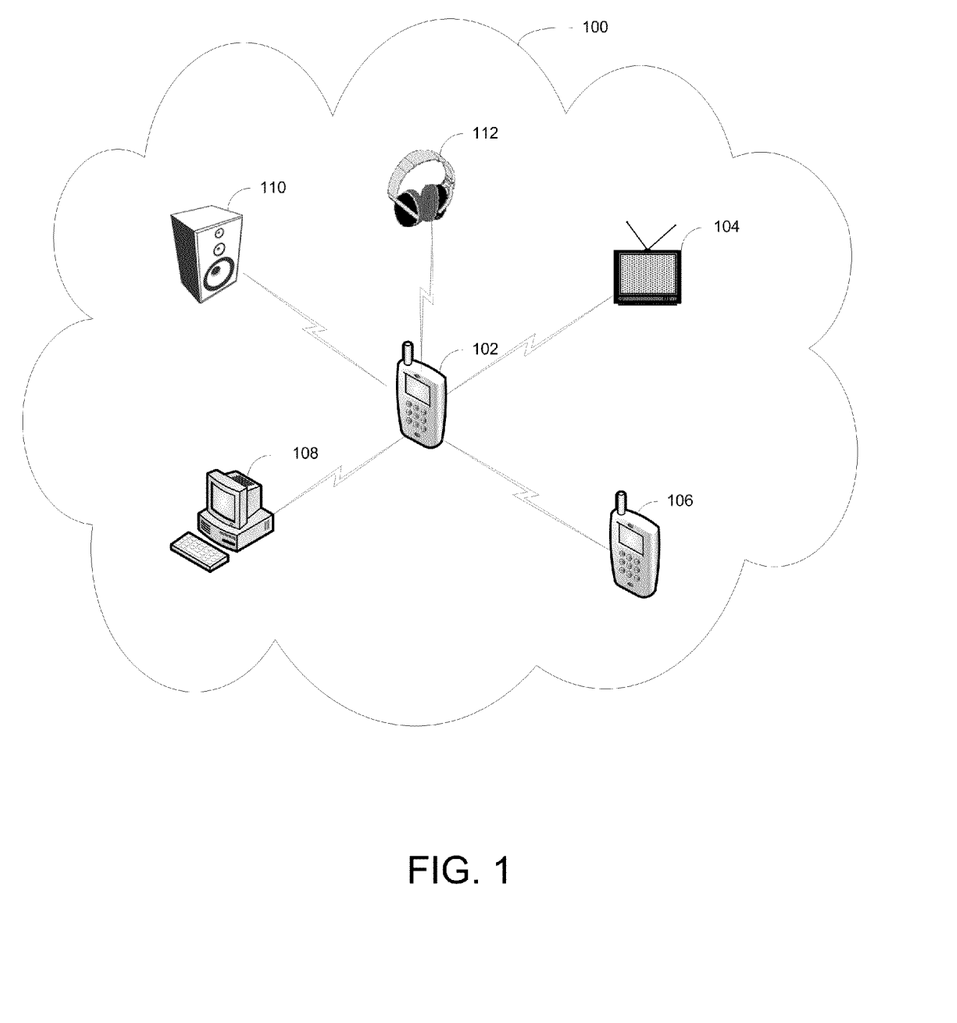
FIG. 1 is an overview of a short-range wireless system in which the present patent disclosure may be implemented.

Referring to FIG. 1, a short-range wireless system 100 in which the present patent disclosure may be implemented is shown. A wireless device 102 is in communication with five wireless devices or accessories 104, 106, 108, 110 and 112. In the example shown in FIG. 1, the wireless device 102 assumes the role of a master, and the wireless devices or accessories 104, 106, 108, 110 and 112 assumes the role of a client.

A master wireless device may include, but is not limited to, a mobile telephone, a laptop computer, a personal digital assistant (PDA), a smart phone and a portable-computing device.

A client wireless device or accessory may further include, but is not limited to, the wireless device listed in the above, as well as radio-frequency identification tag, pager, Global Positioning System (GPS) receivers, digital cameras, video game consoles, and other wireless accessories.

Figure 2:
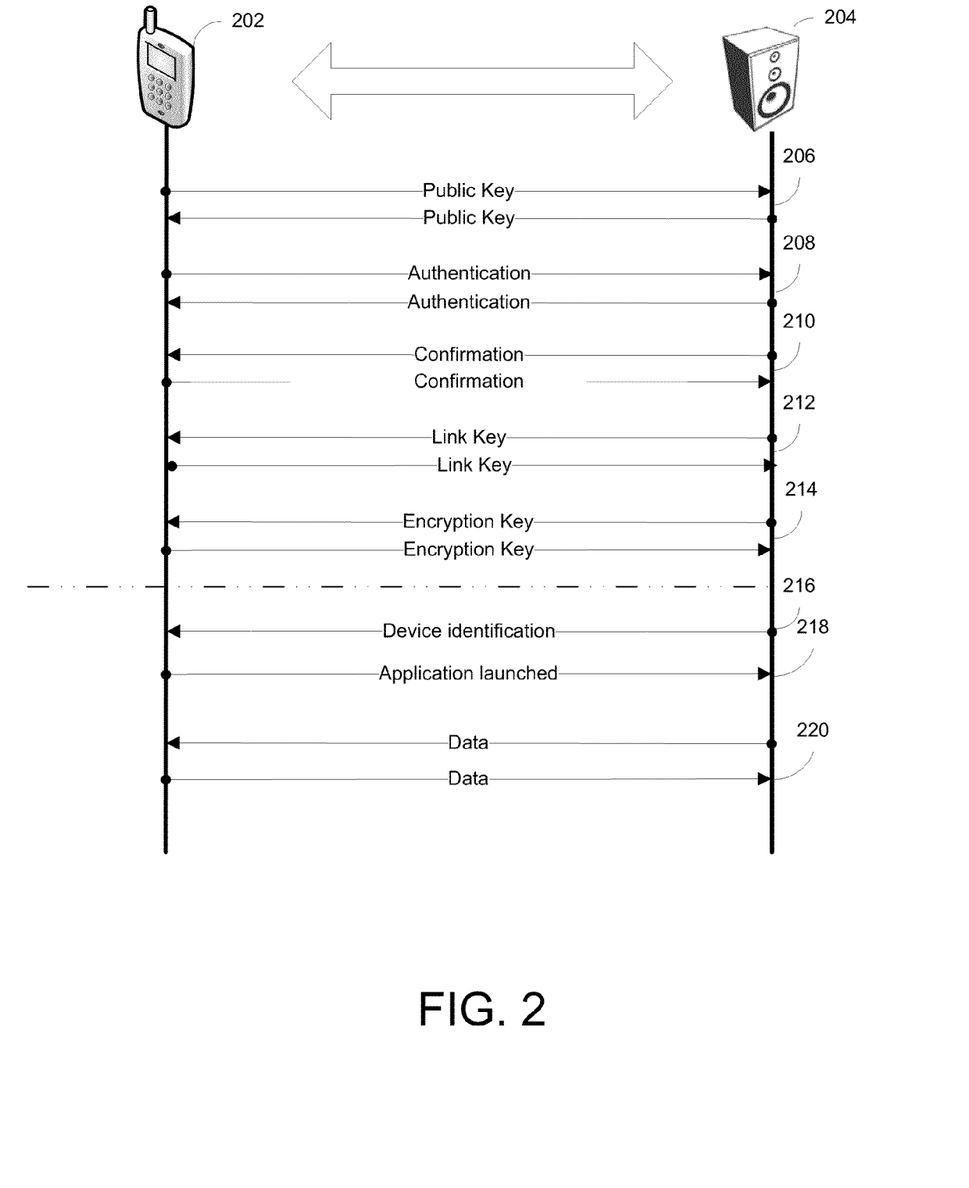
FIG. 2 depicts interactions between a master device and a client device.

Referring to FIG. 2, when a client wireless device 204 is in the radio coverage area provided by the master device 202, the master device 202 detects the presence of the client wireless device 204, while the client device 204 discovers the service provided by the master device 202. In the example of the Bluetooth™, the effective radio coverage area is a piconet. A Bluetooth™ device in discoverable mode transmits on demand information such as device name, device class, list of services, device features, manufacturer, Bluetooth™ specification used, etc.

Using the Bluetooth™ as a non-limiting example, the client device 204 and the master device 202 start to associate by first exchanging public keys 206. The public keys in general need to be generated only once per device and may be computed in advance of pairing. A device may, at any time, choose to discard its public-private key pair and generate a new one, although there is not a requirement to do so. Pairing is initiated by the initiating device sending its public key to the receiving device. The responding device replies with its own public key.

Using the exchanged public keys, each wireless device authenticates the other wireless device 208. A number of protocols is available for authentication, for example but not limited to: numeric comparison, out-of-band (OOB), Just Works, and passkey entry. The authentication generally results in a new shared key between the master wireless device 202 and the client wireless device 204.

The master wireless device 202 and the client wireless device 204 may further compute 210 a new confirmation value that includes the previously exchanged values and the newly derived shared key.

During the link key exchange 212, a link key, used to maintain the pairing, is computed by the master wireless device 202 and the client wireless device 204 from the derived shared key and the previously publicly exchanged data.

Finally, an encryption key is generated 214 for the association between the master wireless device 202 and the client wireless device 204.

The above steps are described using the Bluetooth™ technology as an example, it should be apparent to a person skilled in the art that other technologies may be used for the short-range wireless system.

Further, it should be apparent to a skilled artisan, and as further discussed below, that many steps such as authentication, encryption may be optional as the requirements for the security vary from application to application. For example, if a client device is a radio streaming audio to the master device, the data may not need to be encrypted, and the client device does not need to be authenticated. The exemplary Bluetooth™ services generally require either encryption or authentication, and as such require pairing before they allow a remote device to use the given service. However, some Bluetooth™ services elect not to explicitly require authentication or encryption so that pairing does not interfere with the user experience. The embodiments of the present patent disclosure as described below can be practiced in any short-range wireless system as long as the wireless device 202 and the client wireless device 204 are associated, and the wireless device 202 is aware of the associated client device.

Once the client wireless device 204 is associated with the master wireless device 202, an identification 216 of the client wireless device 204 is sent to the wireless device 202. The master wireless device 202, in accordance with an embodiment of the present patent disclosure, launches 218 an application automatically based on the received device identification. The master wireless device 202 may then provide or receive 220 data from the client wireless device 204.

Figure 3:
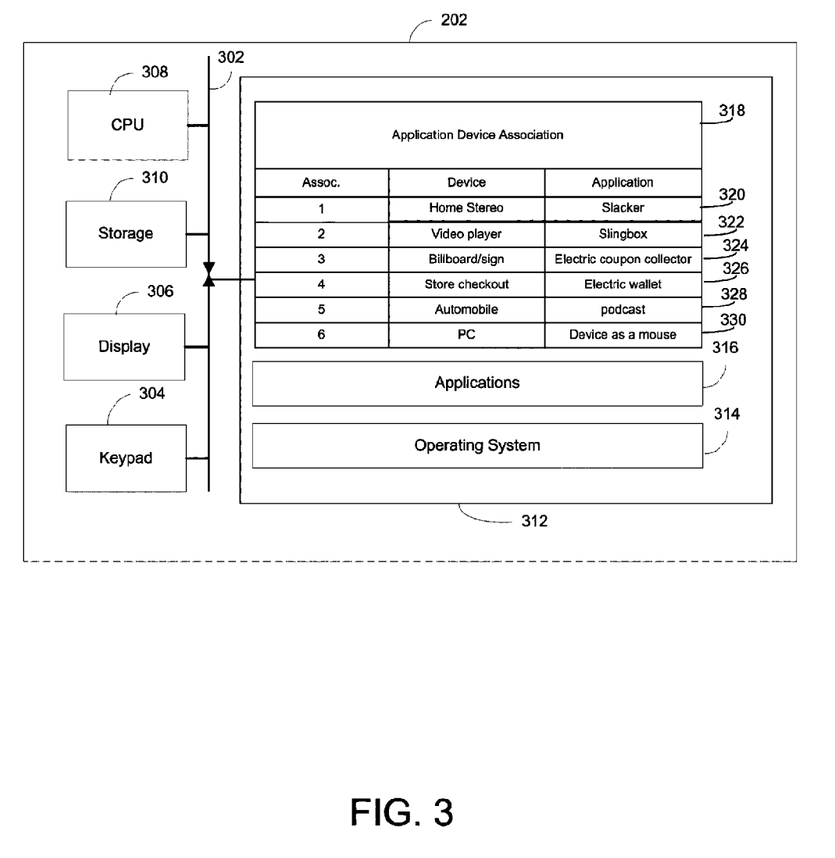
FIG. 3 is a block diagram showing the hardware and software components of a wireless device, in accordance with one embodiment of the present patent disclosure.

FIG. 3 is a block diagram showing the hardware and software components of a master wireless device 202, in accordance with one embodiment of the present patent disclosure. Bus 302 is a communication medium that connects keypad 304, display 306, a processor or CPU 308, and non-volatile storage 310 to memory 312. CPU 308 performs the methods of the disclosed embodiments by executing the sequences of operational instructions that comprise each computer program resident in, or operative on, memory 312. Memory 312 includes operating system 314 and applications 316. Operating system 314 controls keypad 304 and display 306, and manages memory 312.

The master wireless device 202 in accordance with one embodiment of the present patent disclosure also includes information about the applications available on the master wireless device 202 and client wireless devices which are associated with these applications. The information may be in a form of a table 318 where a plurality of applications are associated with a plurality of client devices. For example, if the client wireless is a home stereo equipment, the application Slacker which helps a listener to create personalized stations and discover new music, may be considered as an associated software. When the master wireless device 202 is in the proximity of the home stereo equipment, that is, when the master wireless device 202 is likely moved to the communication range of the home stereo equipment as a client wireless device, the home stereo equipment is associated 320 with the master wireless device 202. In accordance with one embodiment of the present patent disclosure, the corresponding application, for example, Slacker, is automatically launched on the master wireless device 202 and the audio content delivered to the client device home stereo equipment. Similarly, application "Slingbox" may be automatically launched when the master wireless device 202 is in the proximity of, and associated with a video player 322 and the content delivered thereto. A data exchange device such as an electric coupon collector may be launched on the master wireless device 202 when the master wireless device 202 in the near of a billboard or a price sign in a supermarket 324. Other exemplary client device application associations include: an electric wallet is automatically launched when the master wireless device 202 is in the proximity of a store checkout 326, a podcast is automatically launched when the master wireless device 202 is in the car 328 and the master wireless device 202 may be used as a mouse when it is in the proximity of a PC 330. These relationships may be, for example but not limited to, predetermined, set as default in the master wireless device 202 or entered by the user. Table 318 may be set in a number of ways, it may be predetermined and set by the user, or it may correspond to the last application associated with the client device, or it may be derived from data sent by the client device. For example, upon pairing, the device may send a signal indicating its characteristics. The client device may be an audio only device in which case an audio only application may be loaded, or the client device may be a video device in which case a video application would be loaded.

Referring also to FIG. 2, it should be clear not all client device—master device associations require encryption and/or authentication, for example, in the examples of billboard and electric coupon collector 324. Other client device—master device associations may need encryption and authentication, for example, in the case of store checkout and electric wallet.

Figure 4:
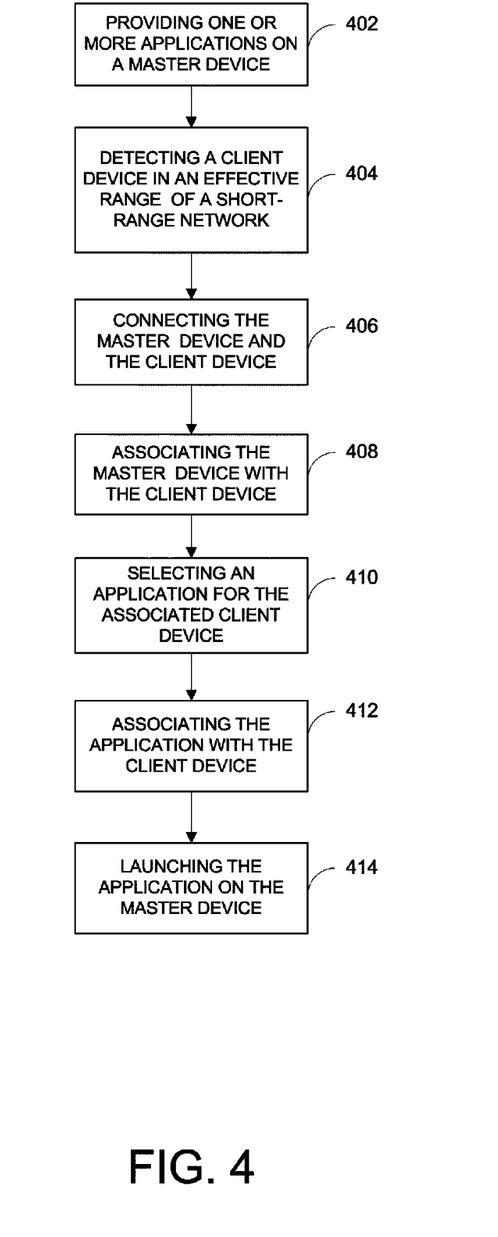
FIG. 4 illustrates an automatic launch of an application in accordance with one embodiment of the present patent disclosure.

FIG. 4 illustrates an automatic launch of an application in accordance with one embodiment of the present patent disclosure. One or more applications which may be associated with different client wireless devices are provided on a master wireless device 402, both the client wireless devices and the master wireless device support a short-range wireless network, for example but not limited to, a Bluetooth™ network. The master wireless device detects a presence of the client wireless device 404, generally within the effective range of the short-range wireless network. The detection of the client device may be triggered by a client device approaching the master device, or the master device comes into the proximity of the client device. The master wireless device and at least one of the client wireless devices are connected wirelessly 406, and associated with each other 408. In the non-limiting example of Bluetooth™ technology, the client device is paired with the master device. An application is then selected among the plurality of applications is suitable for the client wireless device 410, this selected application is then associated with the client wireless device 412, and automatically launched 414.

Figure 5:
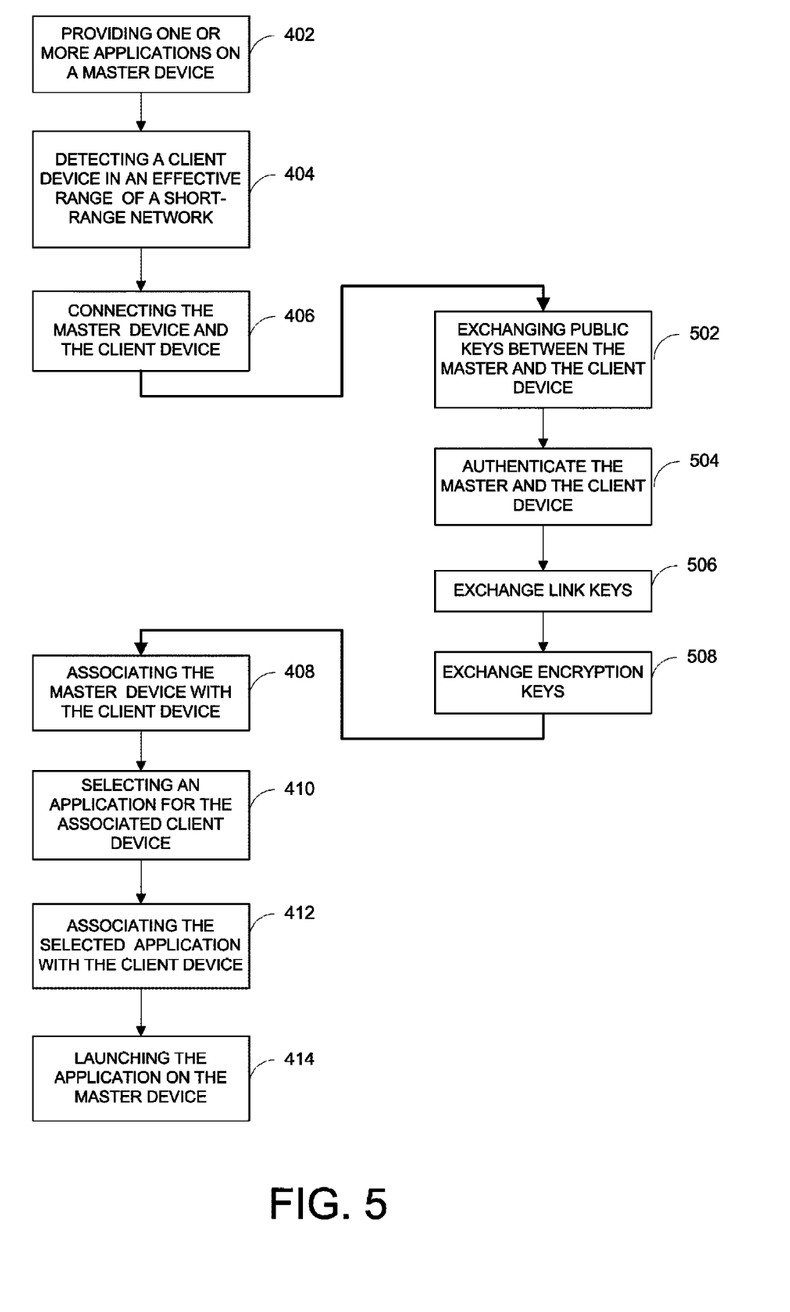
FIG. 5 illustrates an automatic launch of an application in accordance with another embodiment of the present patent disclosure.

FIG. 5 illustrates an automatic launch of an application in accordance with another embodiment of the present patent disclosure where a secure association between the client wireless devices and the master wireless device is desired. After the master wireless device and at least one of the client wireless devices are connected wirelessly 406, the client device and the master device exchange public keys 502. The public keys in general need to be generated only once per device and may be computed in advance. Using the exchanged public keys, each wireless device authenticates the other wireless device 504. A number of protocols is available for authentication, for example but not limited to, numeric comparison, out-of-band (OOB), Just Works, and passkey entry. The authentication generally results in a new shared key between the master wireless device and the client wireless device 504.

During the link key exchange 506, a link key, used to maintain the association, is computed by the master wireless device and the client wireless device. Finally, an encryption key is generated and exchanged 508.

Figure 6:
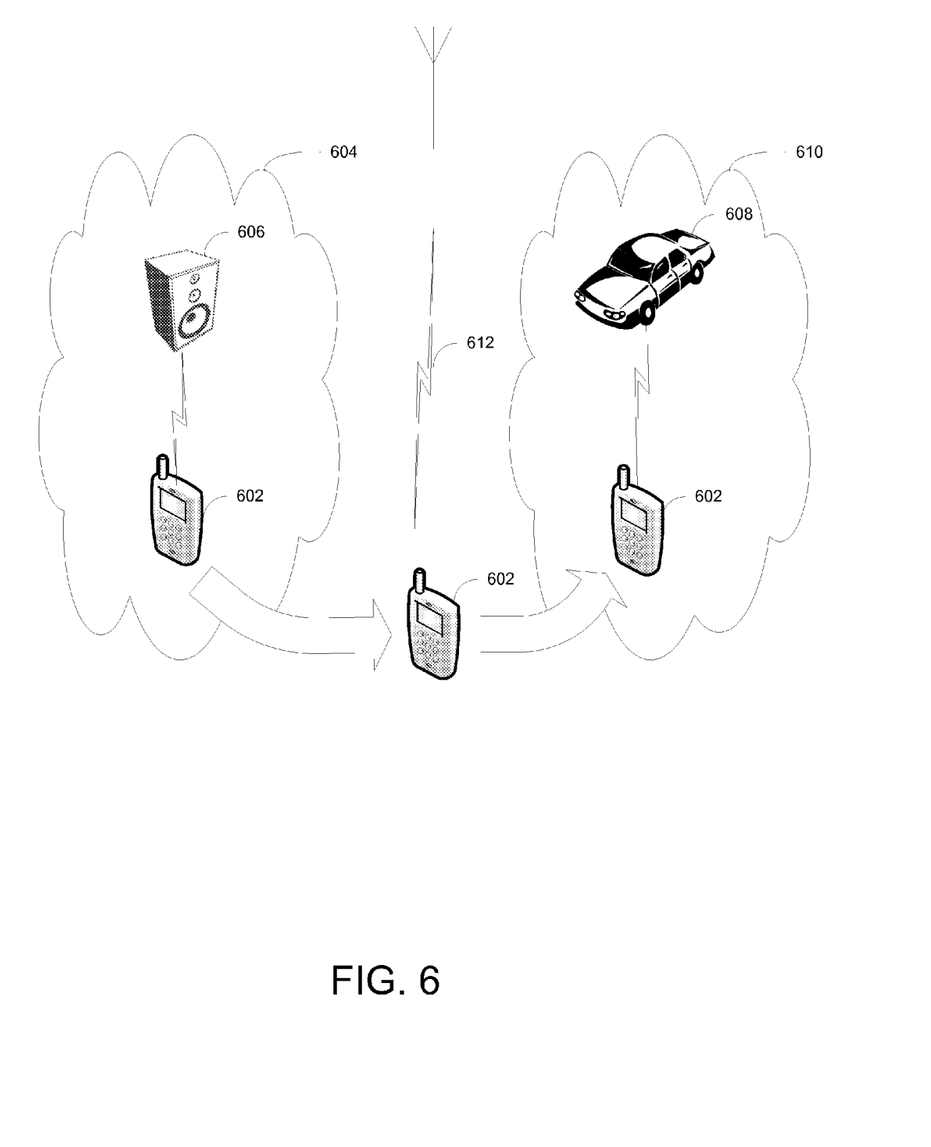
FIG. 6 illustrates another embodiment of the present patent disclosure in which the wireless device transitions from a first location to a second location.

FIG. 6 illustrates another embodiment of the present patent disclosure. A master wireless device 602 may transition from a first location to a second location. For example, from an indoor location where the master wireless device 602 is associated with a home stereo 606 to a car 608, where the effective range of the short-range wireless system is moved from an office 604 to the car 608 having a second effective range 610.

Figure 7:
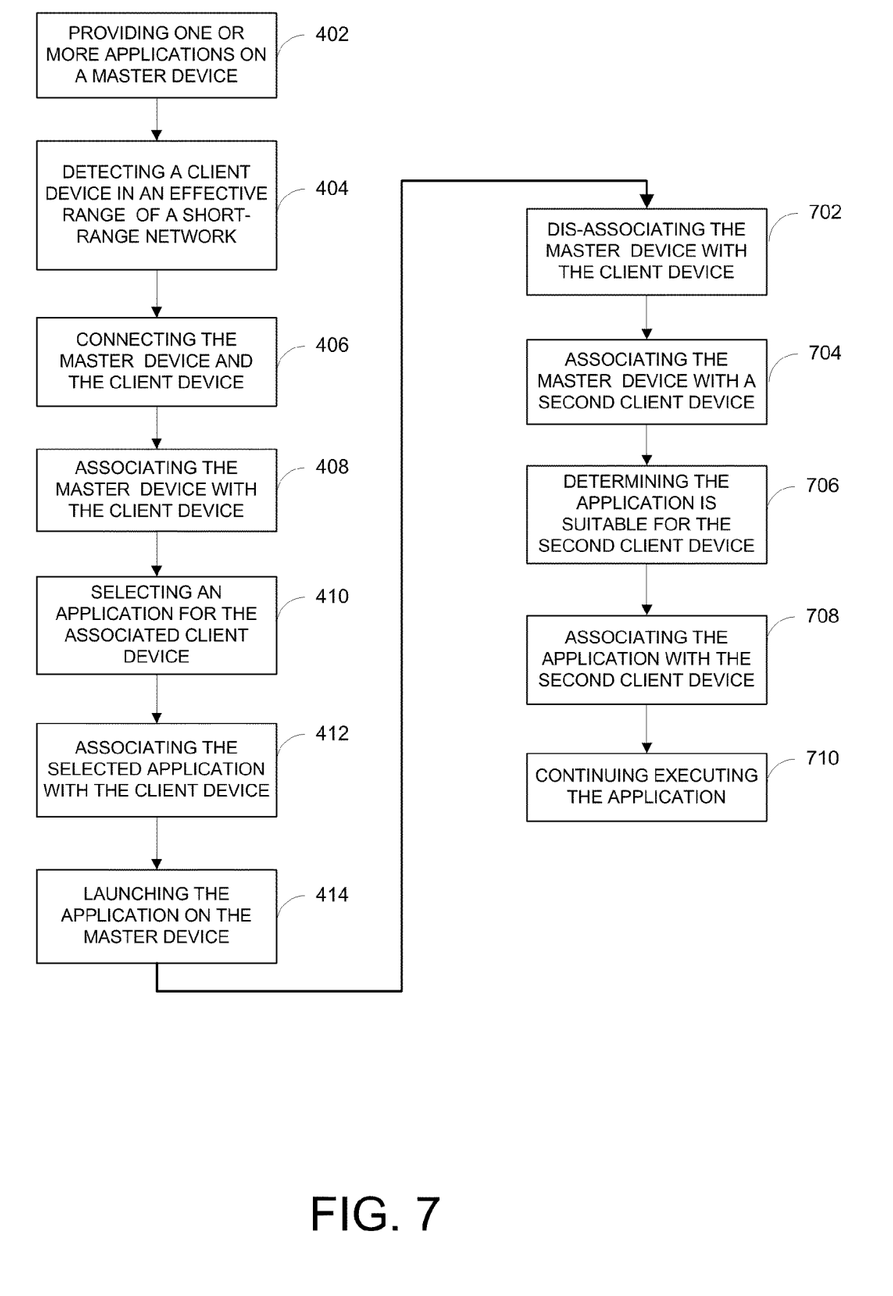
FIG. 7 illustrates an automatic launch of an application in accordance with yet another embodiment of the present patent disclosure.

FIG. 7 illustrates the steps of this embodiment. After the application, which is associated with the first client wireless device 606, is launched, the master wireless device 602 may be moved from a first location to a second location, thereby the master wireless device 602 and the first client wireless device 606 are disassociated 702. When a second client device is in the effective range of the short-range wireless system of the master wireless device 602, the second client device may be associated 704 with the master wireless device 602, similar to the association between the master wireless device 602 and the first client wireless device 606. It is then determined 706 whether the application which was associated with the first client wireless device 606, and executed on the master wireless device 602 is also suitable for the second device 610, if yes, the application is associated with the second client device (708) being continued (710) on the master wireless device 602.

In accordance with another embodiment of the present patent disclosure, and referring to FIG. 3 and FIG. 6, when the master wireless device 602 transitions from the first location to the second location, the master wireless device 602 may be executing the application continuously, for example, receiving a broadcast audio or video stream directly 612, and buffer the data on the master wireless device 602. The data may be buffered in the memory 312 or stored in the non-volatile storage 310. The buffered or stored data may then be played at the second location, for example, in the car.

Figure 8:
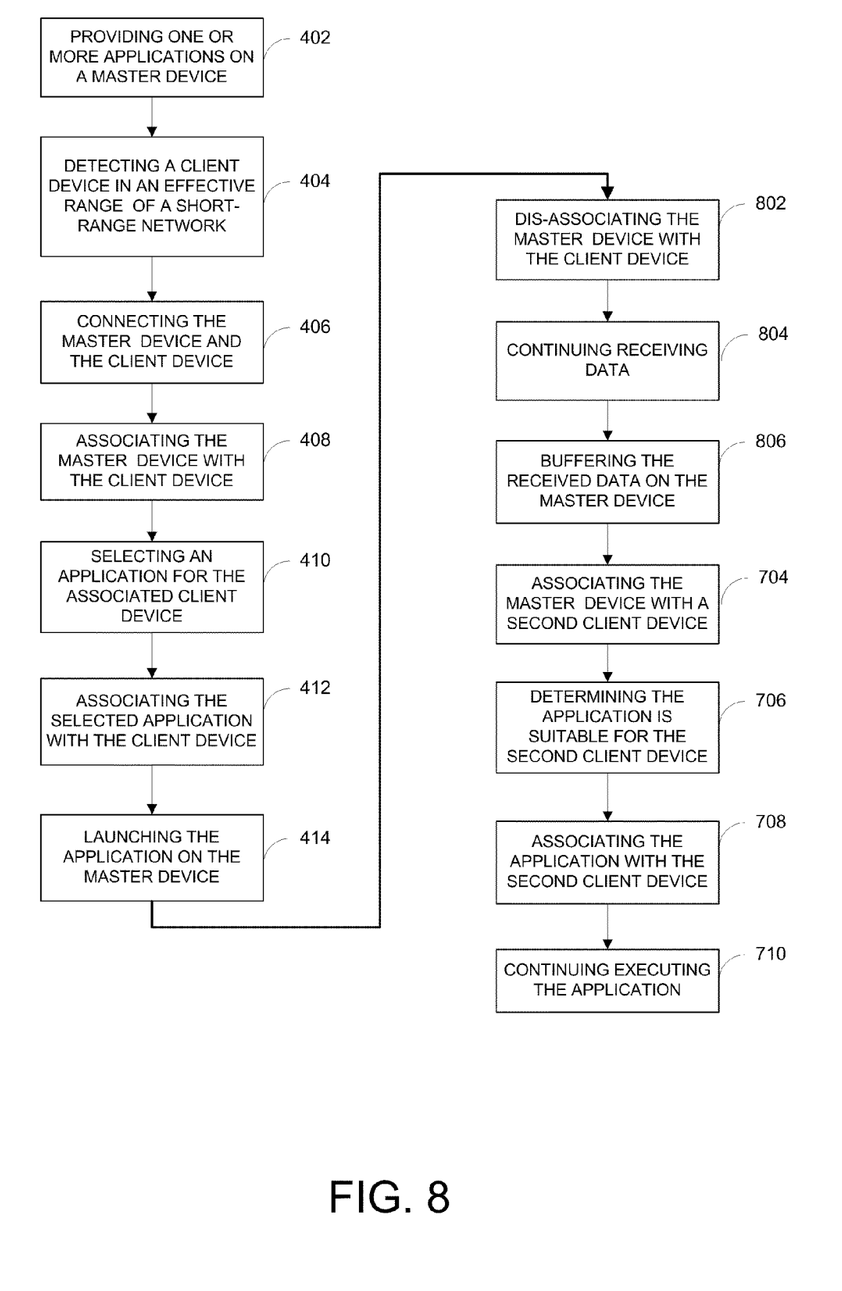
FIG. 8 illustrates an automatic launch of an application in accordance with yet another embodiment of the present patent disclosure.

FIG. 8 illustrates the additional steps of this embodiment. After the disassociation 802 of the master wireless device 602 and the first client wireless device 606, the master wireless device 602 continues to receive 804 data used by the application, the received data may be buffered 806 in the memory or stored in the non-volatile storage of the master wireless device 602. The buffered or stored data may be used by the application executed at the second location, after the association with the second client device as described in the above.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise. It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage medium for execution by a programmable processor; and method actions within the scope of the present patent disclosure can be performed by a programmable processor executing a program of instructions to perform functions of the patent disclosure by operating on input data and generating output. Embodiments within the scope of the present patent disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present patent disclosure may be used in a variety of applications. Although the present patent disclosure is not limited in this respect, the methods disclosed herein may be used in many apparatuses such as in the transmitters, receivers and transceivers of a radio system. Radio systems intended to be included within the scope of the present patent disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A method for managing applications on a wireless device for:
   providing one or more applications on the wireless device, the wireless device used in a short-range wireless system defining a range of less than one hundred meters;
   detecting a presence of a wireless accessory having an accessory type in the range of the short-range wireless system;
   exchanging public keys between the wireless device and the wireless accessory;
   authenticating the wireless device and the wireless accessory;
   exchanging link keys between the wireless device and the wireless accessory;
   exchanging encryption keys between the wireless device and the wireless accessory;
   associating the wireless device with the wireless accessory;
   selecting, based on the accessory type, an application from the one or more applications for the associated wireless accessory;
   associating the application with the wireless accessory; and
   launching the application on the wireless device.

2. The method according to claim 1, wherein the short-range wireless system is a Bluetooth™ system; and the associating the wireless device with the wireless accessory comprises pairing the wireless device with the wireless accessory.

3. The method according to claim 1, further comprising:
   disassociating the wireless device and the wireless accessory;
   associating the wireless device with a second wireless accessory;
   associating the selected application with the second wireless accessory; and
   continuing the execution of the application on the wireless device.

4. The method according to claim 3, further comprising:
   receiving data after the disassociating the wireless device and the wireless accessory;
   buffering the data on the wireless device; and
   continuing the execution of the application on the wireless device using the buffered data.

5. The method according to claim 1, wherein the application is an audio only application and the wireless accessory is an audio reproduction device.

6. The method according to claim 1 wherein the application is a video application and the wireless accessory is a video reproduction device.

7. The method according to claim 1 wherein the application is a data exchange application and the wireless accessory is a data exchange device.

8. A wireless device used in a short-range wireless system, the wireless device comprising:
a memory including one or more applications, and an application device association table for associating one or more applications with a plurality of wireless accessories, each of the wireless accessories having an accessory type; and
a processor for:
detecting a presence of a wireless accessory in a range of the short-range wireless system, wherein the range is less than one hundred meters;
exchanging public keys between the wireless device and the wireless accessory;
authenticating the wireless device and the wireless accessory;
exchanging link keys between the wireless device and the wireless accessory;
exchanging encryption keys between the wireless device and the wireless accessory;
associating the wireless device with the wireless accessory;
selecting, based on the accessory type, an application from the one or more applications for the associated wireless accessory;
associating the application with the wireless accessory; and
launching the application.

9. The wireless device according to claim 8, wherein the short-range wireless system is a Bluetooth™ system; and the associating the wireless device with the wireless accessory comprises pairing the wireless device with the wireless accessory.

10. The wireless device according to claim 8, wherein the wireless device authenticates with the wireless accessory; and exchanges link keys with the wireless accessory.

11. A non-transitory computer readable storage medium storing instructions or statements for use in the execution in a computer of a method for managing applications on a wireless device in a short-range wireless system, the method comprising:
executing one or more applications;
detecting a presence of a wireless accessory having an accessory type in a range of the short-range wireless system, wherein the range is less than one hundred meters;
exchanging public keys between the wireless device and the wireless accessory;
authenticating the wireless device and the wireless accessory;
exchanging link keys between the wireless device and the wireless accessory;
exchanging encryption keys between the wireless device and the wireless accessory;
associating the wireless device with the wireless accessory;
selecting, based on the accessory type, an application from the one or more applications suitable for the associated wireless accessory;
associating the selected application with the wireless accessory; and
launching the application.

12. The non-transitory computer readable storage medium according to claim 11, wherein the short-range wireless system is a Bluetooth™ system; and the associating the wireless device with the wireless accessory comprises pairing the wireless device with the wireless accessory.

13. The method according to claim 1, further comprising: sending data from the wireless device to the wireless accessory.

14. The method according to claim 1, wherein the short-range wireless system uses INFRARED DATA ASSOCIATION (IrDA), Ultra-Wideband™ (UWB), Z-Wave™ or ZigBee™.

15. The method according to claim 1, wherein the authentication uses NUMERIC COMPARISON, OUT-OF-BAND (OOB), JUST WORKS, or PASSKEY ENTRY protocol.

16. The method according to claim 1, wherein the short-range wireless system is a wireless personal area network (PAN).

* * * * *